March 22, 1960

D. B. POWELL 2,930,020

MOUNTING AND CONNECTING MEANS FOR ELECTRIC
CIRCUIT CONTROLLING DEVICES

Filed Oct. 2, 1958

INVENTOR.
DAVID B. POWELL
BY Robert H. Casey
ATTORNEY

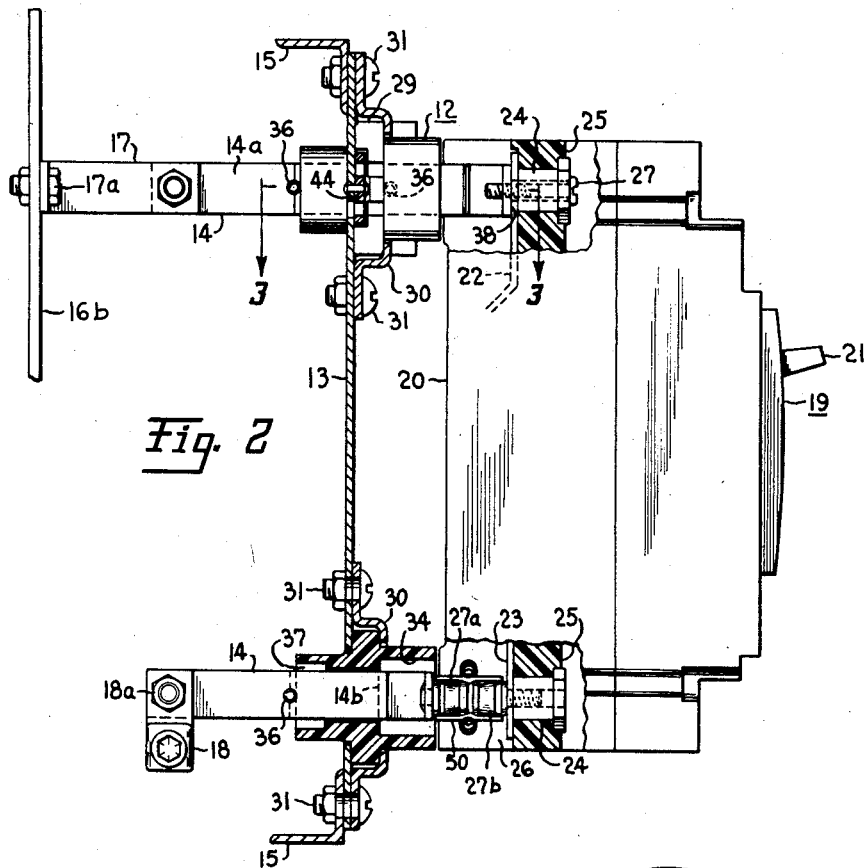
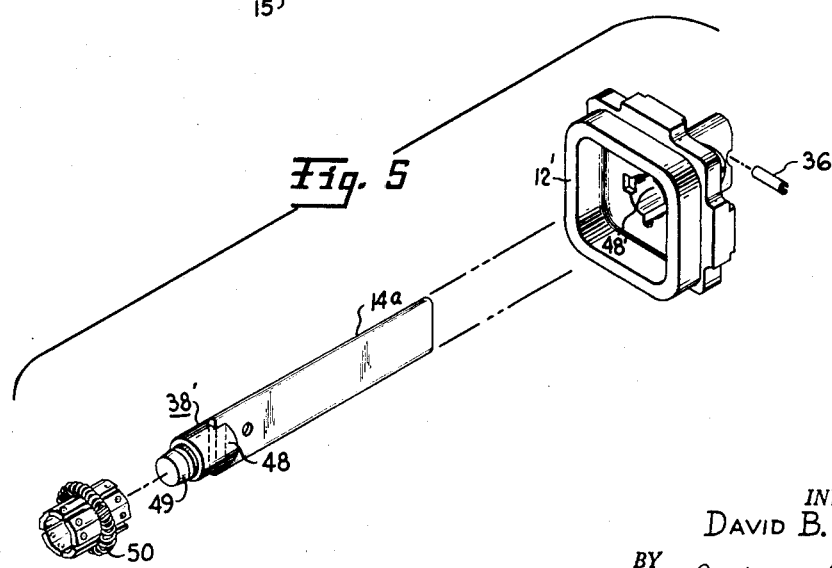

March 22, 1960  D. B. POWELL  2,930,020
MOUNTING AND CONNECTING MEANS FOR ELECTRIC
CIRCUIT CONTROLLING DEVICES
Filed Oct. 2, 1958  3 Sheets-Sheet 3
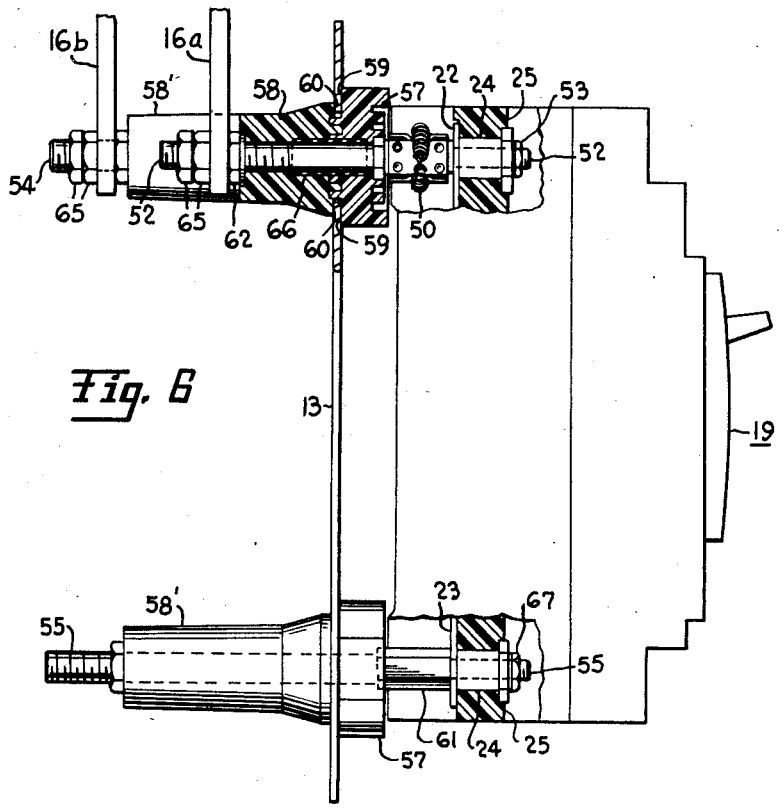
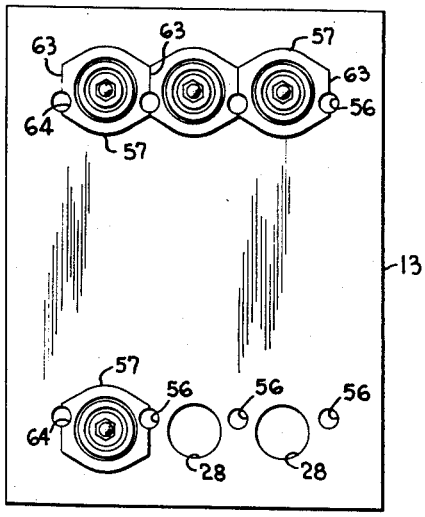
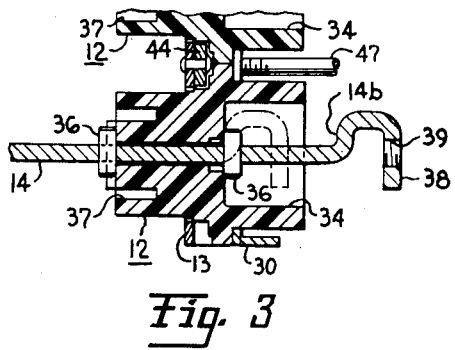
INVENTOR.
DAVID B. POWELL
BY *Robert A. Casey*
ATTORNEY

United States Patent Office 2,930,020
Patented Mar. 22, 1960

2,930,020

MOUNTING AND CONNECTING MEANS FOR ELECTRIC CIRCUIT CONTROLLING DEVICES

David B. Powell, Bristol, Conn., assignor to General Electric Company, a corporation of New York Application October 2, 1958, Serial No. 764,944

4 Claims. (Cl. 339—64)

This invention relates to mounting and connecting means for electric circuit controlling devices, and more particularly it relates to a sub-base assembly for mounting and electrically connecting such devices in control centers, switchboards and the like.

It is common practice in the art of relatively low voltage electric power control and distribution to mount a plurality of relatively small multipole electric circuit breakers or switches in side-by-side relation at the front of a grounded metal housing. Each multipole breaker has two or three line terminals and a corresponding number of load terminals. The load terminals are adapted for connection to individual utilization circuits which are to be controlled by the respective breakers, while the line terminals are connected to polyphase electric power supply bus bars also located in the grounded metal housing. For convenient installation and maintenance and for safety and other reasons, the electric power bus is ordinarily located in a separate compartment at the rear of the housing, and the electrical connections from the breaker terminals to the bus and to the utilization circuits are made by means of suitable electroconductive studs which are supported in insulated relation by a structural member of the housing and extend from the front of the housing into the rear bus compartment. The breaker terminals may be bolted or connected by suitable plug-in type contacts to appropriate contact elements of the respective studs. The term "sub-base assembly" as used herein refers to the assembly of electroconductive studs and supporting means therefor that is provided for each circuit breaker or switch.

It is a general object of the present invention to provide a simple and relatively inexpensive sub-base assembly for a multipole circuit breaker or the like wherein the center-to-center spacing between adjacent electroconductive studs which are respectively supported by individual insulators is made accurately to correspond to the center-to-center spacing between adjacent preformed terminals of the circuit breaker without need for extreme and expensive precision in the manufacture or assembly of the parts.

Another object of this invention is the provision of a sub-base assembly utilizing strap-like electroconductive studs which can be selectively oriented in different planes without affecting the center-to-center spacing between the contact elements of adjacent studs.

Still another object of the invention is the provision, for a multipole circuit breaker, of an improved sub-base assembly which provides convenient electrical connecting and physical mounting means for the breaker and in which accurate positioning and alignment of all parts is assured.

In accordance with my invention, a sub-base assembly for a multipole electric circuit controlling device comprises supporting means including a metallic plate member or panel having at least two spaced apertures therein. I also provide at least two insulators which are relatively loosely received in the respective apertures of the plate member, and a pair of elongated electroconductive studs which extend through the respective insulators for connection to adjacent poles of the circuit controlling device. The insulators are secured to the plate member by suitable mounting means. Each of the insulators is provided with a flanged portion having at least one straight edge which is disposed in abutting relation to a cooperating straight edge of the flanged portion of the adjacent insulator, whereby the center-to-center spacing between the electroconductive studs is accurately determined by the insulators without the need for untoward precision in the size and location of the spaced apertures in the mounting plate.

In one aspect of the invention the electroconductive studs are elongated strap-like members of rectangular cross section. Corresponding ends of the studs terminate in contact portions adapted for connection respectively to adjacent poles of the circuit controlling device, and the centerline of each contact element is colinear with the longitudinal centerline of the associated stud. The flanged portion of each insulator is made with a generally square cross section defined by straight edges symmetrically disposed with respect to the longitudinal centerline of the associated stud, and the insulators are secured to the plate member with selected straight edges in abutting relationship. With this arrangement the studs may be selectively oriented in different planes while the center-to-center spacing between the contact elements remains unaffected.

My invention will be better understood and its various objects and advantages will be more fully appreciated from the following description taken in conjunction with the accompanying drawings in which:

Fig. 2 is a section view of a sub-base assembly along the line 2—2 of Fig. 1 showing a circuit breaker mounted thereon;

Fig. 3 is a section view of the sub-base assembly along the line 3—3 of Fig. 2;

Fig. 5 is an exploded perspective view of an insulator and electroconductive stud constructed in accordance with another embodiment of my invention;

Fig. 6 is a side elevation with portions broken away of a circuit breaker mounted on a sub-base assembly constructed in accordance with still another embodiment of the invention; and Fig. 7 is a front elevation with the breaker removed of the sub-base assembly of Fig. 6.

Figure 1:
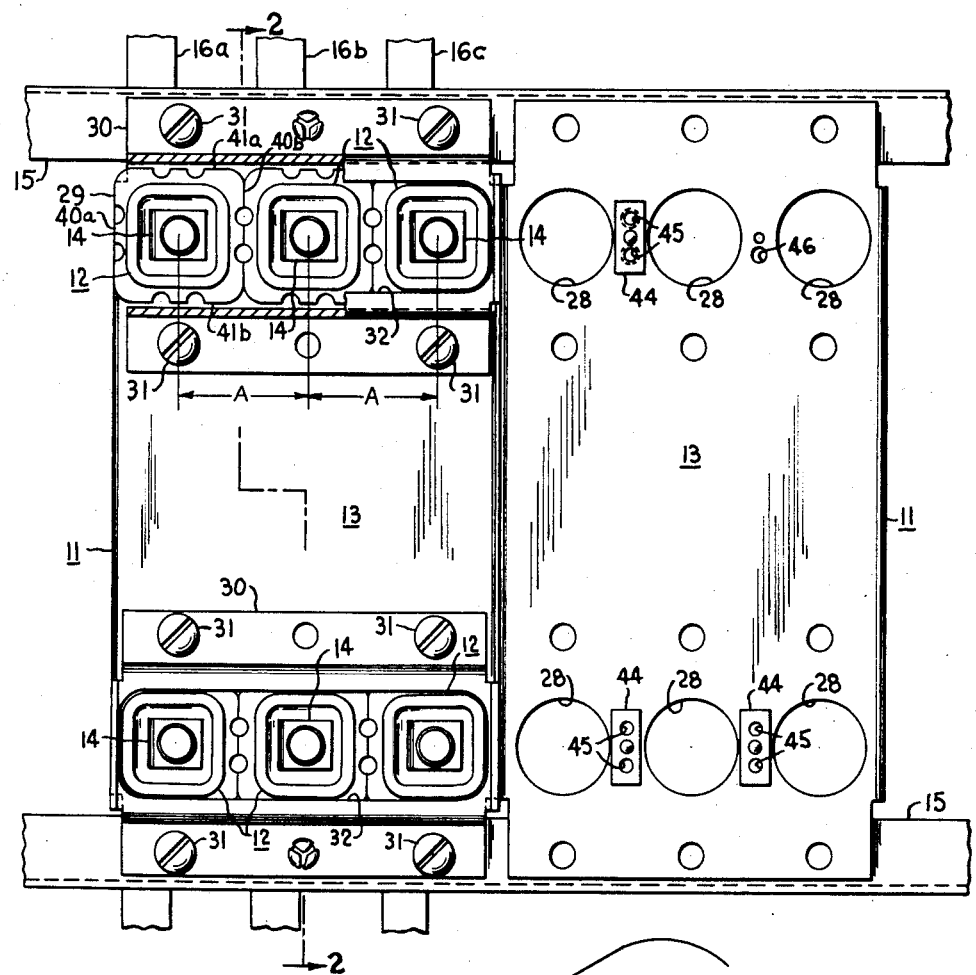
Fig. 1 is a front elevation of two sub-base assemblies constructed in accordance with one embodiment of my invention, only the plate member portion of the right-hand assembly being shown.

Referring now to Fig. 1, I have shown two sub-base assemblies indicated generally by the reference number 11 disposed in side-by-side relationship. Each sub-base assembly 11 comprises a plurality of insulators 12 supported by means including a metallic mounting panel or plate member 13 with each insulator having an individual electroconductive stud 14 extending therethrough. As shown in Figs. 1 and 2, each of the plate members 13 is preferably disposed in a vertical plane and is suitably fastened at its top and bottom to horizontally extending supporting angles 15. The supporting angles 15 are in turn mounted on the frame of a grounded sheet metal housing (not shown), the housing of conventional construction such as found in the switchboard or control center art.

The insulators 12 of each sub-base assembly 11 are arranged in side-by-side relation two groups forming two spaced-apart parallel rows. The electroconductive studs 14 associated with certain insulators (the top row) are respectively connected to conductors 16a, 16b and 16c of a polyphase electric power supply bus supported at the rear of the plate member 13. Referring now to Fig. 2, the connection between each stud 14 of the top row and the respective conductor of the electric power bus is made by means of an intermediate connecting strap 17 and the bolts 17a or the like. The rear end of each stud 14 associated with each of the insulators of the bottom row is connected by bolt 18a to a suitable cable clamping lug 18 which is adapted to receive an electroconductive cable (not shown) for supplying current to an individual utilization circuit. The corresponding front ends of the respective studs 14 are connected to line and load terminals of the respective poles of a multipole electric circuit breaker 19 by connecting means to be described.

Referring to Fig. 2, the circuit breaker 19 illustrated is of conventional construction and comprises a molded insulating casing 20 containing conventional circuit making and breaking contacts and a mechanism for operating the contacts, not shown. A manually operable handle 21 projects at the front of the breaker 19 for controlling the internal operating mechanism. The illustrated breaker is a 3-pole breaker, each pole comprising internal contacts (not shown) connected to separate line and load terminals 22 and 23, respectively. The circuit breaker 19 includes tubular electroconductive inserts 24 which extend through a hole in a shelf portion 25 of the breaker structure and into contact with terminal conductors 22 and 23 respectively. In the form shown in the upper or line terminal of Fig. 2, a clamping bolt 27 is used to connect the stud 14 to the breaker terminal strap 22. In this form the breaker 19 is both electrically connected and physically supported by the studs 14 of the sub-base assembly 11.

As best seen in the right-hand assembly 11 illustrated in Fig. 1, the plate member 13 is provided with a plurality of spaced circular apertures 28 arranged in two spaced-apart parallel rows, and one insulator 12 is received in each aperture 28. Each insulator 12 includes a flange portion 29 which is located adjacent the front surface of the plate member 13, and this flanged portion 29 is sandwiched between the plate member 13 and a metallic retaining member 30 rigidly fastened thereto. Preferably a separate metallic member 30 is used for each row of insulators.

As is clearly shown in Fig. 1 and 2, each member 30 is generally channel-shaped. The feet of the member 30 are fastened to plate member 13 by suitable bolts 31 or the like, and the crown of the member 30 is provided with a single elongated rectangular aperture 32 which overlies the three circular apertures 28 disposed in a row in the plate member 13. The insulators 12 are received in side-by-side abutting relation in the aperture 32 of channel member 30, and the flanged portion 29 of each insulator is firmly trapped between the cooperating metallic members 13 and 30. The members 13 and 30 are preferably made of non-magnetic material such as aluminum, and a single aperture 32 is used in each channel member 30 in order to reduce eddy currents and consequent heating and also to provide clearance for breaker-securing bolts (not shown).

In the form shown in the upper or line terminal of Fig. 2, the body portion 14a of the strap-like stud extends through a cooperating rectangular opening 33 centrally located in the insulator 12. See Fig. 4. A pair of locking pins 36 are inserted in cooperating holes of stud 14 at opposite surfaces of insulator 12, thereby interlocking the stud to the insulator. An annular cavity 37 is formed at the rear of insulator 12 in order to increase the creepage path from stud 14 to the edge of aperture 28 in metallic plate member 13. The forward end of the stud 14 terminates in a contact portion 38 which in the Figs. 1–4 embodiments of my invention has a frontwardly facing flat contact surface disposed in a plane perpendicular to the longitudinal centerline of the elongated body portion 14a of the stud. A tapped hole 39 (Figs. 1 and 4) is centrally located in contact portion 38 to receive the threaded end of clamping bolt 27 whereby the strap 2a is clamped in abutting engagement with contact portion 38 to connect the stud 14 to the appropriate pole of the circuit breaker 19.

In the form of the invention shown in the lower or load terminal of Fig. 2, the stud 14 is shifted longitudinally with respect to the insulator 12 in comparison to the position of the stud 14 shown in the upper or line terminal. It is retained in this position by means of locking pin 36 at the rear surface of the insulator 12 and by means of the offset portion 14b engaging a forward surface thereof in recess 34.

The contact portion 38 of the stud 14 in this form has a generally cylindrical contact element 27a rigidly fastened thereto by suitable means such as by brazing. The contact element 27a is connected to a corresponding contact element 27b carried by the circuit breaker terminal, by means of a plug-in type connector 50, such for example as shown in my prior Patent 2,809,362, although other types of connectors may of course be used.

As is apparent in the drawings, and particularly in Fig. 3, the contact portion 38 of stud 14 is disposed so that its centerline is aligned with the longitudinal centerline of the body portion 14a of the stud.

The rear portion of each insulator 12 preferably is cylindrical in form, and the diameter of this cylindrical portion is less than the diameter of the circular apertures 28 in plate member 13. Thus the insulator 12 is loosely received in aperture 28. The flanged portion 29 of insulator 12 has two opposite parallel straight edges 40a and 40b, and the insulators 12 are disposed so that the respective straight edges 40a and 40b of adjacent insulators are in abutting relationship with respect to each other. This abutting relationship of the cooperating straight edges 40a and 40b of the flanged portions 29 of the insulators determines the center-to-center spacing of the electroconductive studs 14 and consequently the center-to-center spacing of the contact elements 38.

It is desirable to have a predetermined center-to-center spacing (A in Fig. 1) precisely maintained between the contact elements 38 of adjacent studs 14. This is because the circuit breakers 19 are ordinarily mounted on the sub-base assemblies 11 at the time the switchboard is being assembled or being installed, and it would obviously be inefficient and troublesome if the contact elements 38 did not exactly line up with the respective preformed breaker terminals whose spacing is fixed and invariable. Since it is relatively inexpensive to mold the insulators 12 with accurate and consistent dimensions, the desired degree of precision in the center-to-center spacing of the contact elements is simply and economically obtained in accordance with my invention. The center-to-center spacing of the studs is therefore not dependent upon the accuracy of the size or location of the apertures 28 in the metallic supporting member 13.

In a preferred embodiment of my invention, illustrated in Figs. 1–5 the flanged portion 29 of each insulator 12 has a regular polygonal cross section (preferably square) defined by straight flat edges 40a, 40b, 41a, and 41b which are symmetrically disposed with respect to the longitudinal centerline of the associated stud 14. Each straight edge of the flanged portion of one insulator is adapted to be disposed in abutting relation with any straight edge of the flanged portion of the adjacent insulator. This construction enables the insulators 12 to be secured to the plate member 13 with selected straight edges of the flanged portions 29 in parallel, abutting relationship, whereby the strap-like body portion 14a of the studs may be selectively oriented in different planes. In accordance with my invention, changing the orientation of the strap-like studs 14 does not affect the center-to-center spacing A between adjacent contact elements 38, the dimension A being accurately fixed by the flanged portions 29 of the insulators whose cooperating straight edges are disposed in abutting relationship regardless of the stud orientation.

Figure 4:
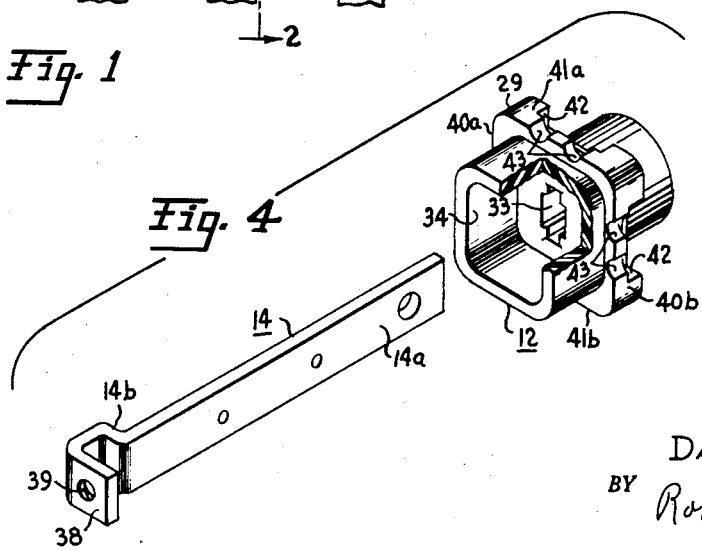
Fig. 4 is an exploded perspective view of an insulator and electroconductive stud used in the Fig. 1 embodiment of the invention.

As can be seen in Figs. 2–4, each of the straight edges 40a, 40b, 41a and 41b of the flanged portion 29 of each insulator 12 has a small rectangular portion removed to form a notch 42 adjacent the plate member 13, and each edge also has a pair of semi-circular recesses 43 leading into the notch 42. A relatively small rectangular lug 44 is suitably fastened to the plate member 13 intermediate adjacent apertures 28, as is best seen in the right-hand sub-base assembly 11 of Fig. 1. Each lug 44 has a pair of tapped holes 45, and the plate member 13 is provided with a cooperating through hole 46 which registers with one of the tapped holes 45 of each lug 44. The notches 42 in the flanged portion 29 of each insulator 12 are provided to accommodate this lug 44. See Figs. 2 and 3. The purpose of the lugs 44 is to enable the circuit breaker 19 to be positively fastened to the plate member 13 by suitable elongated mounting bolts 47 (Fig. 3) if desired. This additional physical support for the circuit breaker is desirable when the electrical connection between the breaker terminals and the electroconductive studs 14 are made by means of plug-in type disconnects as shown in connection with the lower or load terminals of Figs. 1–4.

Additional embodiments of my invention wherein the connections between the electroconductive studs 14 of the sub-base assembly 11 and the breaker terminals are made by plug-in type disconnects are illustrated in Figure 5 and in Figures 6 and 7 respectively. Fig. 5 illustrates a modification of the insulator 12 and stud 14 shown in Fig. 4. In Fig. 5 the contact element 38' at the frontward end of the electroconductive stud 14 comprises an enlarged cylindrical portion 48 terminating in a generally cylindrical member 49. The cylindrical portion 48 bottoms in a cooperating cylindrical recess 48' formed in the insulator 12'. The cylindrical member 49 has an annular contact surface which is designed for connection to a spring-loaded connector assembly 50 similar to that mentioned previously. It is apparent in Fig. 5 that the centerline of the contact element 38' is aligned with the longitudinal centerline of the body portion 14a of the associated electroconductive stud 14. The embodiment of the invention illustrated in Figs. 6 and 7 is in accordance with the disclosure of my aforementioned Patent 2,809,362.

As can be seen in Fig. 6, the electric circuit breaker 19 is provided at one end with line terminal studs 52 mounted on the shelf portion 25 of the breaker structure by suitable means such as by providing the stud 52 with a threaded portion having a clamping or retaining nut 53 threaded thereon. The stud 52 passes through an aperture in shelf portion 25 and has an enlarged portion (not shown) providing a shoulder which is clamped against the terminal strap 22 by action of the nut 53.

The electrical device 19 is supported on plate member 13 by means including electroconductive studs 52 and 54. In addition, the circuit breaker may be positively mounted on plate member 13, if desired, by suitable elongated bolts (not shown), passing through the holes 56 in the plate member. See Fig. 7. Each of the electroconductive studs 54 is mounted on, and insulated from, the plate member 13 by insulating means including a forward insulator 57 and a cooperating rearward insulator 58.

The plate member 13 is provided with a plurality of spaced circular apertures 28 illustrated in Fig. 7. Each of the forward insulators 57 has a depending circular abutment adapted to be relatively loosely received within one of the apertures 28 and an adjacent flanged portion 59 adapted to overlie the front surface of member 13. The rearward insulator 58 has a raised circular abutment on its forward surface adapted to be received within a corresponding circular recess at the rear of insulator 57 and has an adjacent shoulder portion 60 adapted to lie against the rear surface of the plate member 13. See Fig. 6. The stud 52 passes through centrally aligned circular openings in the insulators 57 and 58 and includes a cylindrical contact portion to which the plug-in connector 50 is connected. A short tubular insulating sleeve 66 surrounds the stud 52 at its intermediate portion adjacent the meeting faces of the insulators 57 and 58. The stud 52 has its rearward end threaded and adapted to receive a clamping nut 62 for retaining the parts in assembled relation and in position on the plate member 13.

The flanged portion 59 of each of the forward insulators 57 is made of a predetermined width and provided with two opposite parallel straight edges 63 which abut against similar edges of adjacent insulators, and the apertures 28 in the panel member 13 are made oversize with respect to the circular abutment portions of insulator 57. By this means, as was the case with the structure illustrated in Figs. 1–5 and described above, a plurality of insulators 57 may be assembled on the plate member 13 and brought in side-by-side abutting relation thereby to determine the center-to-center spacing of the electroconductive studs 54. The center-to-center spacing of the studs is not dependent upon the accuracy of the location of the holes 28 in the plate member 13.

As can be seen in Fig. 7, semi-circular recesses 64 are formed in each of the straight edges 63 of the flange portion 59 of each insulator 57, and these recesses provide clearance between adjacent insulators for the above referred to mounting bolts which pass through holes 56 in the plate member 13.

In order to connect the studs 54 to the electric power supply, electrical conductors 16a and 16b are provided having holes therein for receiving the rearward ends of the studs 52 and 54 which have retaining nuts 65 threaded thereon. For the purpose of "staggering" the conductors to obtain maximum electrical clearance, I may space conductors 16b further from the plate member 13 than conductor 16a by utilizing studs 54 of greater length, combined with rearward insulators 58' of greater length.

The electroconductive studs 55 are identical to the studs 52 and 54 except that each of the forward ends of the studs 55 is extended at 61 and has a reduced portion passing through insert 24 and providing a shoulder which is clamped against the terminal strap 23 by means of nut 67.

While I have shown and described several embodiments of my invention by way of illustration, many modifications will occur to those skilled in the art. I therefore contemplate by the concluding claims to cover all such modifications as fall within the true spirit and scope of my invention.

What I claim as new and desire to secure by Letters Patent of the United States is:

1. A sub-base assembly for use with an electric circuit-controlling device comprising: supporting means including a metallic plate member having a pair of spaced apertures therein; an insulator for each of said apertures, each said insulator including a reduced portion extending through one of said apertures and an enlarged portion overlying the surface of said plate adjacent said aperture, said reduced portion being substantially smaller than said aperture; a pair of elongated electro-conductive studs extending through said insulators, respectively, each stud being adapted for connection to a terminal of the circuit-controlling device; said enlarged portion of each said insulator having at least one edge portion disposed in abutting relation to a cooperating edge portion of the enlarged portion of the other insulator thereby to determine the center-to-center spacing of the studs; and means for securing the insulators to the plate member.

2. A sub-base assembly for use with a multipole electric circuit-controlling device comprising: supporting means including a metallic plate member having a pair of spaced apertures therein; an insulator for each of said apertures, each said insulator including a reduced portion extending through one of said apertures and an enlarged portion overlying the surface of said plate adjacent said aperture, said reduced portion being substantially smaller than said aperture, each of said insulators having a centrally located rectangular opening therethrough; a pair of electro-conductive studs having elongated, strap-like body portions extending through the openings in the respective insulators and interlocked to said insulators, each of the studs being terminated at one end with a contact element the center line of which is colinear with the longitudinal center line of the body portion of the stud, the contact elements of the stud being adapted for connection to corresponding poles of the circuit-controlling device; said enlarged portion of each of said insulators having a regular polygonal cross section, each edge of said enlarged portion of each of the insulators being adapted to be disposed in abutting relation with a corresponding edge of the enlarged portion of the other insulator thereby to determine the center-to-center spacing of the contact elements; and mounting means for securing the insulators to the plate member with selected edges in abutting relationship, whereby the strap-like body portion of each stud may be selectively oriented with its major flat surface in different planes without affecting the center-to-center spacing of the contact elements.

3. A sub-base assembly for use with a multipole electric circuit-controlling device comprising: supporting means including a metallic plate member having a plurality of spaced apertures therein; an insulator for each of said apertures, each said insulator including a reduced portion extending through one of said apertures and an enlarged portion overlying the surface of said plate adjacent said aperture, said reduced portion being substantially smaller than said aperture, each of the insulators having a centrally located rectangular opening therethrough; an electro-conductive stud for each of said insulators having an elongated strap-like body portion of rectangular cross section extending through the opening in a corresponding insulator and interlocked thereto, each of the studs being terminated at one end with a contact element the center line of which is colinear with the longitudinal center line of the body portion of the stud, the contact elements of the respective studs being adapted for connection to corresponding poles of the circuit-controlling device; each of said insulators including an enlarged portion of generally square cross section defined by straight edges symmetrically disposed with respect to the longitudinal center line of the body portion of the associated stud; and mounting means securing the insulators to the plate member with selected straight edges of the flanged portions of the respective insulators disposed in abutting relationship, whereby the orientation of the major flat surfaces of the strap-like body portions of the studs may be selectively altered without altering the center-to-center spacing of the contact elements.

4. A sub-base assembly for electric circuit-controlling devices comprising: supporting means including a metallic plate member having a pair of spaced apertures therein; an insulator for each of said apertures, each said insulator including a reduced portion extending through one of said apertures and an enlarged portion overlying the surface of said plate adjacent said aperture, said reduced portion being substantially smaller than said aperture, an elongated electro-conductive stud mounted in and extending through each of said insulators respectively, said enlarged portions of each of said insulators having at least one edge portion disposed in abutting relation to a cooperating edge portion of another of said insulators thereby to determine the center-to-center spacing of the studs, means for retaining said insulators on said plate comprising a generally channel-shaped member having at least one aperture in the web portion thereof, and means rigidly securing said channel to said plate with said insulators trapped therebetween and with said studs accessible through said aperture.

References Cited in the file of this patent

UNITED STATES PATENTS

| | | |
|---|---|---|
| 1,183,516 | Anderson | May 16, 1916 |
| 2,340,082 | Sauers | Jan. 25, 1944 |
| 2,438,371 | Marholz | Mar. 23, 1948 |
| 2,445,463 | West | July 20, 1948 |
| 2,823,339 | Locher | Feb. 11, 1958 |
| 2,883,586 | Christensen | Apr. 21, 1959 |